3,256,190
Patented June 14, 1966

3,256,190
THIOPHOSPHONOXYALKANES
David D. Reed, Glenham, James M. Petersen, Fishkill, and Frederick G. Oberender, Wappingers Falls, N.Y., and Herman D. Kluge, deceased, late of Fishkill, N.Y., by Hazel E. Kluge, administratrix, Fishkill, N.Y., assignors to Texaco Inc., New York, N.Y., a corporation of Delaware
No Drawing. Filed Oct. 18, 1962, Ser. No. 232,655
14 Claims. (Cl. 252—46.6)

This invention pertains to novel reaction products derived from the disproportionation of hydroxyalkyl hydrocarbonthiophosphonates. More particularly, it relates to 1,2 - bis(hydrocarbonthiophosphonoxy)alkanes and to their method of manufacture. In addition, it relates to lubricant compositions containing 1,2-bis(hydrocarbonthiophosphonoxy)alkanes.

The 1,2-bis(hydrocarbonthiophosphonoxy)alkanes will be hereafter known as thiophosphonoxyalkanes for reasons of brevity.

The thiophosphonoxyalkanes of the invention have been found to have good detergent dispersant properties in lubricating oils.

The thiophosphonoxyalkanes are represented by the following formula

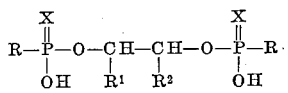

where R is hydrocarbyl (monovalent hydrocarbon derived radical), $R^1$ and $R^2$ are hydrogen or alkyl of from 1 to 6 carbons and X is a chalcogen selected from the group consisting of sulfur and a mixture of sulfur and oxygen.

The thiophosphonoxyalkanes are prepared by disproportioning hydroxyalkyl hydrocarbonthiophosphonates.

PREPARATION OF THE HYDROCARBONTHIO-
PHOSPHONATE REACTANT

The hydroxyalkyl hydrocarbonthiophosphonates and their method of preparation as contemplated herein are described in co-assigned, copending application Serial No. 63,973, filed October 21, 1960, now U.S. Patent No. 3,123,630. In said copending application, the hydroxyalkyl hydrocarbonthiophosphonates are prepared by reacting aromatic hydrocarbons, cycloaliphatic hydrocarbons or aliphatic hydrocarbons with $P_2S_5$ at elevated temperatures to form a hydrocarbon-$P_2S_5$ reaction product. The hydrocarbons which are preferably reacted with the $P_2S_5$ are olefins containing at least 12 carbon atoms although lower molecular weight olefins can be employed. Monoolefinic polymers such as isobutylene polymer, butylene polymer, propylene polymer and copolymers of monoolefins such as propylene and isobutylene are particularly preferred materials. In general, monoolefinic polymers and copolymers having an average molecular weight between 250 and 50,000, preferably between 600 and 5,000, are preferred.

Specifically, the hydrocarbon-$P_2S_5$ reaction product is produced by reacting about 5–40 wt. percent $P_2S_5$ with a hydrocarbon at a temperature of from about 100–320° C. in a non-oxidizing atmosphere, for example, under a blanket of nitrogen, to form the hydrocarbon-$P_2S_5$ reaction product. The hydrocarbon-$P_2S_5$ reaction product is then hydrolyzed by contacting said product with steam at a temperature of between about 100 and 260° C. to convert the reaction product to hydrocarbonthiophosphonic acid and inorganic phosphorus acids. The hydrocarbonthiophosphonic acid has the general formula

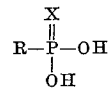

wherein R is a monovalent hydrocarbon radical derived from the charge hydrocarbon and is desirably an alkenyl radical containing 20 to 200 carbon atoms. X is sulfur or a mixture of sulfur and oxygen. X in the above formula is designated as sulfur or a mixture of sulfur and oxygen because the steam hydrolysis step usually results in replacement of a portion of the sulfur joined to the phosphorus with oxygen.

As pointed out in the aforementioned copending application, the inorganic acids are then removed and the thiophosphonic acid is reacted with an alkylene oxide of the formula

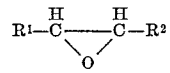

where $R^1$ and $R^2$ are hydrogen or alkyl of from 1 to 6 carbons, to form the hydroxyalkyl hydrocarbonthiophosphonate reactant of the formula

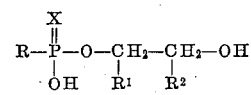

where R, $R^1$, $R^2$ and X are as heretofore defined. The reaction between the olefin oxide and the thiophosphonic acid is conducted at a temperature between 60 and 150° C.

Specific examples of the hydroxyalkyl hydrocarbonthiophosphonate reactant contemplated herein are: 2-hydroxyethyl polybutene (940 M.W.) thiophosphonate, 1-methyl-2-hydroxyethyl polypropylene (2500 M.W.) thiophosphonate, and 1,2-diethyl-2-hydroxyethyl polyisobutylene (1500 M.W.) thiophosphonate.

DISPROPORTIONATION OF THE THIOPHOSPHO-
NATE REACTANT TO FORM THE NOVEL THIO-
PHOSPHONOXYALKANE

The thiophosphonoxyalkane is obtained by heating the aforedescribed hydroxyalkyl hydrocarbonthiophosphonate at a temperature between about 250 and 450° F. for a period of at least about 2 hours. Under preferred conditions, the heating step is accompanied by reduced pressure, e.g., between about 0.01 and 10 mm. Hg, blowing with an inert gas such as nitrogen, or reduced pressure followed by inert gas blowing. The reduced pressure and inert gas sweep facilitate the removal of volatile byproducts and inert solvent (if employed) medium during disproportionation. The final product may be further purified by any standard means such as clay treating and/or treating with an ion exchange resin.

We have also found maximum yield and purity of thiophosphonoxyalkanes can be obtained if the foregoing procedure is modified by adding the step of treating the crude thiophosphonoxyalkane product with an alkylene oxide of the type heretofore described in a mole ratio of crude thiophosphonoxyalkane to oxide of between about 1.0:0.1 and 1.0:0.5 at a temperature of between about 150 and 350° F. The alkylene oxide treatment is preferably followed by an inert gas (e.g. $CO_2$, $N_2$) sweep at a temperature of between about 250 and 450° F. The specific alkylene oxide employed is the one utilized in forming the thiophosphonate reactant.

Examples of the thiophosphonoxyalkanes contemplated herein are: 1,2-bis[polybutene (940 M.W.) thiophosphonoxy]ethane, 1,2-bis[polypropylene (2500 M.W.) thiophosphonoxy]-1,2-diethylethane and 1,2-bis[polyisobutylene (1500 M.W.) thiophosphonoxy]-1-methyl-2-ethylethane.

LUBRICANT COMPOSITIONS CONTAINING THE NOVEL THIOPHOSPHONOXYALKANES

As heretofore stated, the thiophosphonoxyalkanes of the invention impart detergent-dispersant properties to lubricating oils.

The thiophosphonoxyalkanes are present in lubricating oils in concentrations sufficient to impart detergent-dispersant properties thereto. In concentrates used in the formulation of finished lubricants, the concentration of the thiophosphonoxyalkane can be as high as 50 wt. percent. In finished lubricants, the concentration of alkane advantageously falls between 0.2 and 10.0 wt. percent with concentrations between 1.0 and 5.0 wt. percent desirably employed.

The hydrocarbon mineral oils usable in the contemplated lubricant can be paraffin base, naphthene base, or mixed paraffin-naphthene base distillate or residual oils. Paraffin base distillate lubricating oil fractions are used in the formulation of premium grade motor oils such as are contemplated in this invention. The lubricating base generally has been subjected to solvent refining to improve its lubricity and viscosity temperature relationship as well as solvent dewaxing to remove waxy components and improve the pour of the oil. Broadly speaking, mineral lubricating oils having an SUS viscosity at 100° F. between 50 and 1000 may be used in the formulation of the improved lubricants of this invention, but usually the SUS viscosity range falls between 70 and 300 at 100° F.

The mineral lubricating oils containing monohydroxyalkyl esters of hydrocarbonthiophosphonic acids usually contain other additives designed to impart other desirable properties thereto. For example, V.I. improvers such as the polymethacrylates are often included therein as are corrosion inhibitors and other dispersants.

A widely used V.I. improver is a polymethacrylate of the general formula

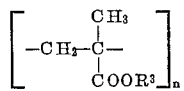

wherein $R^3$ is an aliphatic hydrocarbon radical of from 1 to 20 carbons and $n$ is an integer.

The most commonly used supplementary detergent is an alkaline earth metal alkylphenolate. Barium nonylphenolate, barium dodecylcresolate and calcium dodecylphenolate are examples of such detergents. These products, which are well-known detergent additives, are usually present in the lubricating oil in a concentration between 0.1 and 5.0 wt. percent.

The most commonly used inhibitor and antioxidant is a divalent metal dialkyl dithiophosphate resulting from the neutralization of a $P_2S_5$-alcohol reaction product with a divalent metal or divalent metal oxide. Barium and zinc dialkyl dithiophosphates are the most widely-used oxidation and corrosion inhibitors. Metal dialkyl dithiophosphates are usually present in the lubricant in a concentration between 0.1 and 3.0 wt. percent.

Synthetic lubricating bases of the ester or ether type may also be used as the base oil in the contemplated lubricating compositions. High molecular weight, high boiling liquid aliphatic dicarboxylic acid esters possess excellent viscosity-temperature relationships and lubricating properties and are finding ever-increasing utilization in lubricating oils adapted for high and low temperature lubrication; esters of this type are used in the formulation of jet engine oils. Examples of this class of synthetic lubricating bases are the diesters of acids such as sebacic, adipic, azelaic, alkenylsuccinic, etc.; specific examples of these diesters are di-2-ethylhexyl sebacate, di-2-ethylhexyl azelate, di-2-ethylhexyl adipate, di-n-amyl sebacate, di-2-ethylhexyl n-dodecylsuccinate, di-2-ethoxyethyl sebacate, di-2′-methoxy-2-ethoxyethyl sebacate (the methyl Carbitol diester), di-2′-ethyl-2-butoxyethyl sebacate (the 2-ethylbutyl Cellosolve diester), di-2-n-butoxyethyl azelate (the n-butyl Cellosolve diester) and 2′-butoxy-2-ethoxyethyl n-octyl succinate (the n-butyl Carbitol diester).

Polyester lubricants formed by reaction of an aliphatic dicarboxylic acid of the type previously described, a dihydroxy compound and a monofunctional aliphatic monohydroxy alcohol or an aliphatic monocarboxylic acid in specified mole ratios are also employed as the synthetic lubricating base in the compositions of this invention; polyesters of this type are described in U.S. 2,638,974. Polyesters formed by reaction of an admixture containing specified amounts of heptanediol, sebacic acid, diethylene glycol and 2-ethylhexanoic acid illustrate this class of synthetic polyester lubricating bases.

Polyalkylene ethers as illustrated by polyglycols are also used as the lubricating base in the lubricant compositions of this invention. Polyethylene glycol, polypropylene glycol, polybutylene glycols and mixed polyethylene-polypropylene glycols are examples of this class of synthetic lubricating bases.

The sulfur analogs of the above-described diesters, polyesters and polyalkylene ethers are also used in the formulation of the lubricating compositions. Dithioesters are exemplified by di-2-ethylhexyl thiosebacate and di-n-octyl thioadipate; polyethylene thioglycol is an example of the sulfur analogs of the polyalkylene glycols; sulfur analogs of polyesters are exemplified by the reaction product of adipic acid, thioglycol and 2-ethylhexyl mercaptan.

The following examples further illustrate the invention but are not to be construed as a limitation thereof.

Example I

To a 0.5 liter, 3-neck reaction flask, fitted with a thermometer, distillation column, and gas inlet tube, there was added 250 grams of a paraffinic lube oil solution having an SUS viscosity of 100 at 100° F. containing 0.1 mole of 2-hydroxyethyl thiophosphonate of the formula

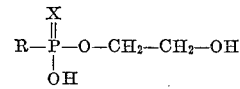

where R is a monovalent polybutene derived radical having an average molecular weight of 940, and X is a mixture of sulfur and oxygen. The 2-hydroxyethyl polybutene (940 M.W.) thiophosphonate analyzed as follows:

| Description | Calculated | Found |
|---|---|---|
| Neut. No | 0.00 | 1.35 |
| Hydroxyl No | 22 | 18 |
| Phosphorus, wt. percent | 1.25 | 1.06 |
| Sulfur, wt. percent | [1] 1.28 | 0.67 |

[1] Based on X=100% sulfur.

The flask contents were then heated 7 hours at 340° F. under a mercury pressure of 200 microns. At the end of the reaction period the final product was subjected to infrared analysis and additional testing and was found to be an oil solution of 1,2-bis[polybutene (940 M.W.) thiophosphonoxy]ethane of the formula

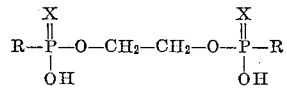

where R is a polybutene radical of an average molecular weight of 940 and X is a mixture of sulfur and oxygen. The product analyzed as follows:

| Description | Calculated | Found |
|---|---|---|
| Neut. No | 0.00 | 4.25 |
| Hydroxyl No | 0.00 | 9 |
| Phosphorus, wt. percent | 1.25 | 1.19 |
| Sulfur, wt. percent | [1] 1.29 | 0.67 |

[1] Based on X=100% sulfur.

*Example II*

To a 0.50 liter flask fitted with a distillation column and inert gas inlet tube there was added 2000 grams of a paraffinic oil solution (100 SUS viscosity at 100° F.) containing 0.70 mole of 2-hydroxyethyl polybutene (940 M.W.) thiophosphonate of the formula

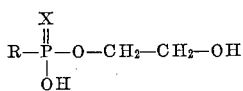

where R is a polybutene radical of an average molecular weight of 940 and X is a mixture of sulfur and oxygen. The reactant analyzed as follows:

| Description | Calculated | Found |
|---|---|---|
| Neut. No | 0.00 | 0.56 |
| Hydroxyl No | 20 | 24 |
| Phosphorus, wt. percent | 0.96 | 0.84 |
| Sulfur, wt. percent | [1] 0.99 | 0.62 |

[1] Based on X=100% sulfur.

The product was heated for 4 hours at 350° F. while simultaneously blowing said heated reaction mixture with nitrogen at a rate of 1 liter/minute. At the end of the heating period the final reaction product was analyzed by infrared analysis and was determined to be an oil solution of 1,2-bis[polybutene (940 M.W.) thiophosphonoxy]ethane of the formula

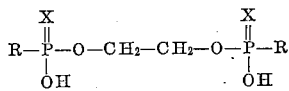

where R is a polybutene radical having an average molecular weight of 940 and X is a mixture of sulfur and oxygen. The product analyzed as follows:

| Description | Calculated | Found |
|---|---|---|
| Neut. No | 0.00 | 4.1 |
| Hydroxyl No | 0.00 | 10 |
| Phosphorus, wt. percent | 0.95 | 0.89 |
| Sulfur, wt. percent | [1] 0.98 | 0.62 |

[1] Based on X=100% sulfur.

*Example III*

To 1900 grams of 1,2-bis[polybutene (940 M.W.) thiophosphonoxy]ethane of the type described in Example I, ethylene oxide was added at a temperature of 250° F. for a period of 1 hour at a rate of 0.5 liter/minute. The product was further blown with nitrogen at 350° F. for a 4 hour period at nitrogen rate of 1 liter/minute. At the end of this period the blown product was analyzed and was found to be an oil solution of 1,2-bis[polybutene (940 M.W.) thiophosphonoxy]ethane of higher purity than the initial 1,2-bis[polybutene (940 M.W.) thiophosphonoxy]ethane and was of the following properties:

| Description | Calculated | Found |
|---|---|---|
| Neut. No | 0.00 | 3.9 |
| Hydroxyl No | 0.00 | 6 |
| Phosphorus, wt. percent | 0.95 | 0.83 |
| Sulfur, wt. percent | [1] 0.98 | 0.58 |

[1] Based on X=100% sulfur.

*Example IV*

An SAE 10W–30 motor oil containing 1,2-bis[polybutene (940 M.W.) thiophosphonoxy]ethane as a detergent was formulated as follows.

COMPOSITION A

| Description: | Concentration, wt. percent |
|---|---|
| Refined paraffinic distillate oil (100 SUS at 100° F.) | 90.52 |
| 1,2-bis[polybutene (940 M.W.) thiophosphonoxy]ethane | 2.20 |
| Zinc isopropyl 1,3-dimethyl butyl dithiophosphate | 0.88 |
| Barium $C_{12}$-alkylphenolate | 1.83 |
| $CO_2$ neutralized basic barium sulfonate | 0.57 |
| Mineral oil concentrate containing 25 wt. percent of the copolymer of mixed methacrylate alkyl esters in which the alkyl ester groups range from butyl to octadecyl | 4.00 |
| Dimethylsilicone, anti-foam agent (p.p.m.) | 150 |

Tests on Composition A were made with the following results.

| Description: | Results |
|---|---|
| SUS viscosity, 100° F. | 315 |
| SUS viscosity, 210° F. | 60.6 |
| Viscosity index | 133 |
| Barium, wt. percent | 0.39 |
| Zinc, wt. percent | 0.098 |

The foregoing lubricating composition was tested in the well-known CLR Sludge Engine Test. In addition, for comparison a control was tested which was identical to the above composition except that it does not contain the thiophosphonoxyalkane additive of the invention. The results are described below:

| Description | 54 hours | 70 hours | 94 hours | 110 hours |
|---|---|---|---|---|
| Composition A | 9.4 | 7.4 | 4.6 | 4.8 |
| Control | 5.4 | | | |

Clean Oil Rating=10.

As can be seen from the above, the control after only 54 hours had a poorer sludge rating than the thiophosphonoxy-containing oil after 70 hours.

We claim:
1. A product selected from the group consisting of 1,2-bis(hydrocarbonthiophosphonoxy)alkane and a mixture of 1,2-bis(hydrocarbonthiophosphonoxy)alkane and the corresponding 1,2-bis(hydrocarbonphosphonoxy)alkane, said 1,2-bis(hydrocarbonthiophosphonoxy)alkane of the formula

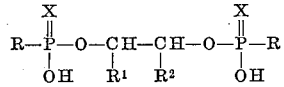

where R is hydrocarbyl derived from a polyolefin having a molecular weight between 250 and 50,000, $R^1$ and $R^2$ are selected from the group consisting of hydrogen and alkyl from 1 to 6 carbons and X is sulfur, said mixture consisting of a major amount of said 1,2-bis(hydrocarbonthiophosphonoxy)alkane and a minor amount of said corresponding 1,2-bis(hydrocarbonphosphonoxy)alkane where X is oxygen.

2. A product in accordance with claim 1 wherein R is a polybutene radical.

3. A product in accordance with claim 1 wherein R is polybutene having an average molecular weight of about 940, $R^1$ and $R^2$ are hydrogen and said product is said mixture.

4. A method of preparing a product selected from the group consisting of 1,2-bis(hydrocarbonthiophosphonoxy) alkane and a first mixture of said 1,2-bis(hydrocarbonthiophosphonoxy)alkane and the corresponding 1,2-bis(hydrocarbonphosphonoxy)alkane, said 1,2-bis(hydrocarbonthiophosphonoxy)alkane of the formula

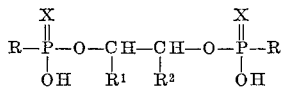

comprising heating a reactant selected from the group consisting of hydroxyalkyl hydrocarbonthiophosphonate and a second mixture selected from the group consisting of said hydroxyalkyl hydrocarbonthiophosphonate and the corresponding hydroxyalkyl hydrocarbonphosphonate, said hydroxyalkyl hydrocarbonthiophosphonate of the formula

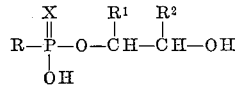

wherein R is hydrocarbyl derived from a polyolefin having a molecular weight between 250 and 50,000, $R^1$ and $R^2$ are selected from the group consisting of hydrogen and alkyl from 1 to 6 carbons and X is sulfur, at a temperature between about 250 and 450° F. for a period of at least about 2 hours, said first mixture consisting of a major amount of 1,2-bis(hydrocarbonthiophosphonoxy) alkane and a minor amount of 1,2-bis(hydrocarbonphosphonoxy)alkane where X is oxygen and said second mixture consists of a major amount of said hydroxyalkyl hydrocarbonthiophosphonate and a minor amount of said hydroxyalkyl hydrocarbonphosphonate where X is oxygen.

5. A method in accordance with claim 4 which is conducted while continuously blowing the reaction mixture with inert gas.

6. A method in accordance with claim 4 which is conducted under reduced pressure.

7. A method in accordance with claim 4 wherein as an additional step, alkylene oxide is introduced into the final reaction mixture at a temperature between about 150 and 350° F. in a mole ratio of said alkane to said oxide of between about 1:0.1 and 1:0.5, and subsequently blowing the oxide treated mixture with an inert gas at a temperature between about 250 and 450° F., said alkylene oxide of the formula

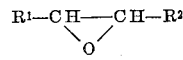

where $R^1$ and $R^2$ are as heretofore defined.

8. A method in accordance with claim 4 wherein R is a polybutene radical.

9. A method in accordance with claim 4 wherein R is a polybutene radical having an average molecular weight of 940, $R^1$ and $R^2$ are hydrogen and said product is said first mixture and said reactant is said second mixture.

10. A lubricant composition comprising a lubricating oil containing between 0.2 and 10 wt. percent of an additive selected from the group consisting of 1,2-bis(hydrocarbonthiophosphonoxy)alkane and a mixture of said 1,2-bis(hydrocarbonthiophosphonoxy)alkane and the corresponding 1,2-bis(hydrocarbonphosphonoxy)alkane, said 1,2-bis(hydrocarbonthiophosphonoxy)alkane of the formula

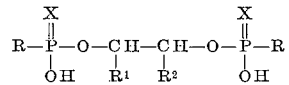

where R is a hydrocarbyl radical derived from a polyolefin of a molecular weight between 250 and 50,000, $R^1$ and $R^2$ are selected from the group consisting of hydrogen and alkyl of 1 to 6 carbons and X is sulfur, said mixture consisting of a major amount of said 1,2-bis(hydrocarbonthiophosphonoxy)alkane and a minor amount of said corresponding 1,2 - bis(hydrocarbonphosphonoxy)alkane where X is oxygen.

11. A lubricating oil as described in claim 10 wherein said alkane is present in an amount between about 0.2 and 10 wt. percent and said lubricating oil is a mineral lubricating oil having a SUS viscosity at 100° F. between 50 and 1,000.

12. A lubricating oil composition in accordance with claim 10 wherein R is a polybutene radical.

13. A lubricating oil composition in accordance with claim 10 wherein R is a polybutene radical having an average molecular weight of 940, $R^1$ and $R^2$ are hydrogen and said additive is said mixture.

14. A method of preparing a product selected from the group consisting of 1,2-bis(hydrocarbonthiophosphonoxy)alkane and a mixture of said 1,2-bis(hydrocarbonthiophosphonoxy)alkane and the corresponding 1,2-bis(hydrocarbonphosphonoxy)alkane 1,2 - bis(hydrocarbonthiophosphonoxy)alkane comprising:

(a) contacting $P_2S_5$ with a polyolefin hydrocarbon of an average molecular weight between 250 and 50,000 at a temperature between about 100 and 320° C. in a non-oxidizing atmosphere, the $P_2S_5$ constituting between about 5 and 40 wt. percent of the reaction mixture, (b) contacting the resulting $P_2S_5$-polyolefin hydrocarbon reaction mixture with steam at a temperature between about 100 and 260° C. and removing formed inorganic phosphorus acids from the steam treated reaction mixture, (c) contacting the resultant inorganic phosphorus acid free, steam treated reaction mixture with an alkylene oxide of the formula.

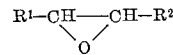

where $R^1$ and $R^2$ are selected from the group consisting of hydrogen and alkyl of from 1 to 6 carbons at a temperature between 60 and 150° C., (d) heating the final reaction mixture of (c) at a temperature of between about 250 and 450° F. for a period of at least about 2 hours, said mixture comprising a major amount of said 1,2-bis(hydrocarbonthiophosphonoxy)alkane and a minor amount of said corresponding 1,2-bis(hydrocarbonphosphonoxy)alkane.

References Cited by the Examiner

UNITED STATES PATENTS

| | | | |
|---|---|---|---|
| 2,726,256 | 12/1955 | Morris et al. | 260—461 |
| 2,736,738 | 2/1956 | Morris | 252—46.6 |
| 3,095,440 | 6/1963 | Newallis et al. | 260—461 |

FOREIGN PATENTS 838,928   6/1960   Great Britain.

DANIEL E. WYMAN, *Primary Examiner.*

L. G. XIARHOS, *Assistant Examiner.*